United States Patent [19]

Suchanek

[11] 4,201,415

[45] May 6, 1980

[54] LONG-DISTANCE TRUCK TRACTOR WITH LIVING QUARTERS

[76] Inventor: Jaroslav Suchanek, 5140 Charles, Detroit, Mich. 48211

[21] Appl. No.: 889,044

[22] Filed: Mar. 22, 1978

[51] Int. Cl.² .............................................. B62D 27/00
[52] U.S. Cl. ................................. 296/190; 180/54 A; 180/89.1; 296/1 S
[58] Field of Search .................. 296/23 R, 28 C, 1 S, 296/91, 137 R, 28 M, 190; 180/89.1, 54 A; 362/74

[56] References Cited

U.S. PATENT DOCUMENTS

| | | | |
|---|---|---|---|
| 1,864,710 | 6/1932 | Austin | 296/64 |
| 2,143,889 | 1/1939 | Ledwinka | 180/89.1 |
| 2,577,836 | 12/1951 | Willson | 296/23 R |
| 3,728,537 | 4/1973 | Barényl | 362/74 |
| 4,121,684 | 10/1978 | Stephens | 296/28 C |

OTHER PUBLICATIONS

"Truck Cab" by Ross A. McFarland and Richard G. Domey, pp. 96–99, 162, 168 of Feb. 1958, Edition of Commercial Car Journal.

Primary Examiner—Robert R. Song
Assistant Examiner—John A. Carroll
Attorney, Agent, or Firm—Irving M. Weiner; Pamela S. Burt; Melvin Yedlin

[57] ABSTRACT

A long-distance truck tractor with two interior levels including driving and navigation equipment and living quarters with sleeping compartments. A stairway interconnects the two levels. A first wrap-around panoramic window occupies the major portion of the front end of the truck tractor, and a second wrap-around panoramic window provides visibility and lighting for the upper second level. Towards the upper rear end of the tractor there is provided an aerodynamic streamlined air-cooler for supplying fresh air to and removing warm air from the engine located at the rear of the truck tractor.

10 Claims, 5 Drawing Figures

LONG-DISTANCE TRUCK TRACTOR WITH LIVING QUARTERS

The present invention relates generally to aerodynamically shaped vehicles with living quarters.

In particular, the present invention relates to a long-distance truck tractor having a plurality of wrap-around panoramic windows, and two interior levels including living quarters.

BACKGROUND

Heretofore, various attempts have been made to improve the efficiency and comfort of long-distance truck drivers. Nevertheless, the most modern truck equipment in use still does not even approach the needs and desires of long-distance truck drivers with respect to ease of driving and navigating, ease of operation, sleeping quarters, hygiene, and obtaining food and drink. Indeed, the prior art attempts have not only failed to satisfy the requirements, desires, and comforts of the long-distance truck driver, but have even left the job of the truck driver well below the level of convenience of the long-distance tour bus driver with respect to the comfort and safe driving conditions.

The prior art is exemplified by Wolf U.S. Pat. No. 2,242,494; Willson U.S. Pat. No. 2,577,836; Stamm U.S. Pat. No. 2,863,695; and Barenyi et al U.S. Pat. No. 3,169,793.

The present invention not only avoids the disadvantages and pitfalls of the prior art and conventionally-available truck tractor equipment, but eminently satisfies the necessities and desires of the long-distance truck driver while doing so by providing a long-distance truck tractor with aesthetic and streamlined aerodynamic lines with great visibility for the driver.

SUMMARY

The present invention provides a long-distance aerodynamically shaped vehicle with living quarters, comprising a vehicle body, and a first level including a first plurality of equipment and areas disposed within the vehicle body. A second level includes a second plurality of equipment and areas disposed within the vehicle body. The second level is disposed above the first level. The first plurality of equipment and areas includes a driver control area. The second plurality of equipment and areas includes at least one sleeping compartment. An engine is disposed at the rear of the vehicle body, and an aerodynamic air-cooler is operably and mechanically connected with the engine to bring fresh air to the engine and to convey warm air away from the engine. The aerodynamic air-cooler has an inlet and outlet disposed at the upper rear portion of the vehicle body. A front right turn signal light is disposed at and around a front right edge of the vehicle body so that the front right turn signal light is visible from in front of and from the right side of said vehicle. A front left turn signal light is disposed at and around a front left edge of the vehicle body so that the front left turn signal light is visible from in front of and from the left of the truck tractor. A first panoramic window is disposed above the front turn signal lights and comprises the major portion of the front of the vehicle body and extends around the front right and left edges of the vehicle body. A second panoramic window is disposed between the first panoramic window and the aerodynamic air-cooler. The second panoramic window provides visibility and light for the second level. The second panoramic window extends across the entire width of the vehicle body and continues over portions of the right and left sides of the vehicle body.

The term "vehicle" as used herein means any conveyance or device for carrying passengers, goods or equipment, and includes, but is not limited to, trucks, buses, cars, tractors, recreational vehicles, campers, motor homes, sleds, trains, airplanes, boats, snowmobiles, limousines, hydroplanes, submarines, bathyscaphes, tanks, cabs, trailers, vans, etc.

An object of the invention is to provide a long-distance vehicle having aerodynamic lines and improved visibility for the driver, with the first and second panoramic windows, together with a roof portion having the air-cooler disposed therein, defining an aerodynamically streamlined upper contour of the vehicle body.

Another object is to provide a vehicle of the foregoing type having new universal light panels for both the front and the rear of the vehicle.

An additional object is to provide a novel vehicle of the foregoing type having equipment and areas for a companion for the driver who has the functions of navigator, mobile dispatcher, communicator, and alternate driver.

A still further object of the invention is to provide a vehicle of the foregoing type which is equipped with sound stereo equipment, C.B. radio, telephone, and T.V. camera equipment.

Other objects and advantages of the present invention will become readily apparent from a reading of the following description and a consideration of the accompanying drawings.

DETAILED DESCRIPTION

Figures 1, 2, 3, 4, 5:
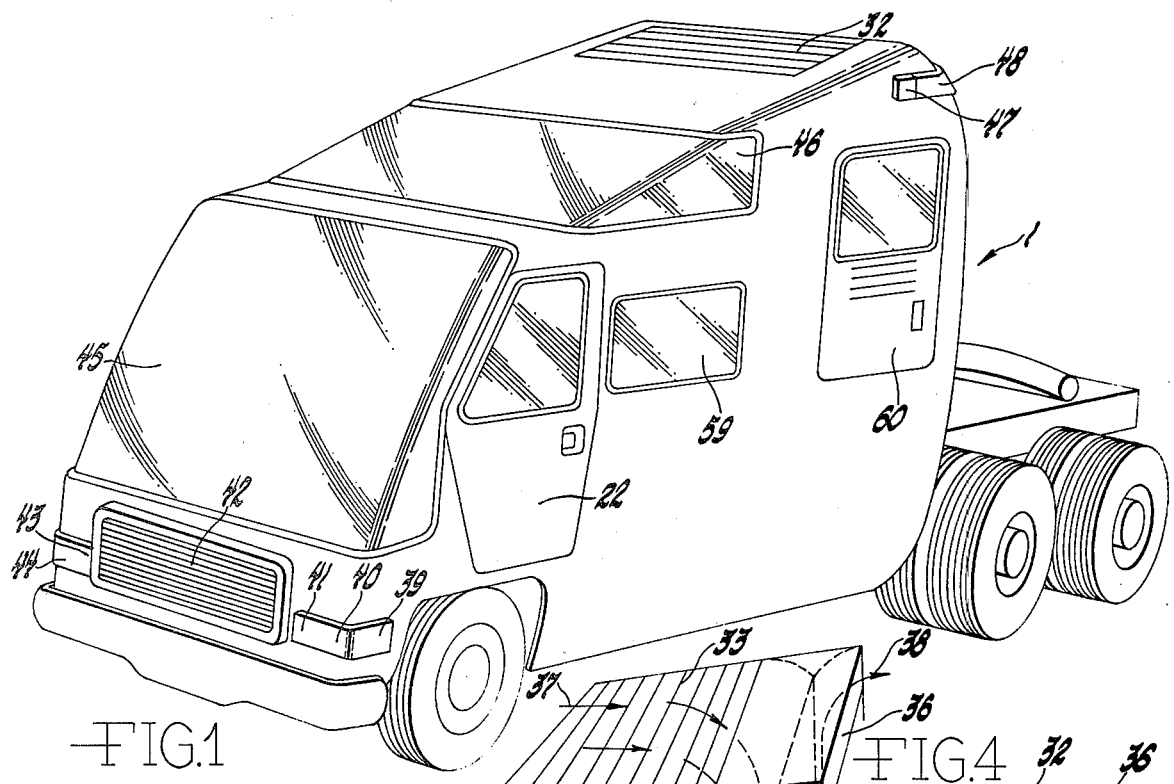
FIG. 1 illustrates a perspective view of a long-distance truck tractor according to a first embodiment of the present invention.
FIG. 2 is a schematic top plan of the interior of the first or lower level within the truck tractor body.
FIG. 3 is a schematic top plan view of the interior of the second or upper level within the truck tractor body.
FIG. 4 is a view of the aerodynamic air-cooler for cooling the truck engine.
FIG. 5 illustrates a partial perspective view of the upper rear left corner of the truck tractor.

Before explaining the present invention in detail, it is to be understood that the present invention is not limited or restricted in its application or uses to the details of construction and arrangement of parts as illustrated in the accompanying drawings, because the present invention is capable of other embodiments and variations and of being practiced or carried out in various ways. Furthermore, it is to be understood that the phraseology or terminology employed herein is for the purpose of description and illustration only, and not for the purpose of limitation or restriction.

With reference to FIG. 1, there is shown an aerodynamically shaped vehicle, such as a truck tractor 1, having a vehicle body, such as tractor body 2.

Within the body 2 there is disposed a first or lower level, as illustrated in FIG. 2, which includes a first plurality of equipment and areas. The first plurality of equipment and areas may include a driver control area 3, a communication panel 4, a navigator and dispatch area 5, an area panel 6, a door 7, a closet 8, a refrigerator-freezer 9, a kitchen area 10, an entertainment console 11, a stairway 12, a library 13, a bathroom area 14, a sit-down shower 15, a table 16, a booth 17, a door 18, an engine 19, a transmission 20, a generator 21, and a door 22. The kitchen area 10 may include a dishwasher, cabinets, sink and disposal, a microwave oven, etc.

Within the body 2 there is disposed a second or upper level, as illustrated in FIG. 3, which includes a second plurality of equipment and areas. The second plurality of equipment and areas may include a double sleeping compartment 23, cabinet space 24, freezer 25, dinnerware storage 26, study desk 27, water tank area 28, storage space 29, mechanical service compartment 30, water tank 31, and the stairway 12.

Although in the illustrated embodiment there has been shown a stairway 12 for interconnecting the first and second levels, the invention should not be restricted to this particular depicted embodiment. For example, in an alternative embodiment, the upper level need not have its own flooring, but may merely comprise open space from the lower level within which even very tall persons can stand and move about erectly. In such an alternate embodiment, various steps and climbing means may be provided for reaching the equipment and areas making up the mentioned second plurality of equipment and areas in the second level.

FIG. 4 shows a streamlined aerodynamic air-cooler 32 which fits in with the body 2 without disturbing or interrupting the aerodynamic smooth lines or smooth flow of air over the body 2. The air-cooler 32 includes a series of louvered inlets 33, an inlet duct 34, a series of outlet ducts 35, and a series of outlets 36.

As indicated hereinabove, the function of the air-cooler 32 is to supply fresh air to and remove warm air from the engine 19 which is disposed at the lower rear portion of the tractor 1. The on-rushing air moving over the top of the tractor 1 enters the inlets 33 and passes down into the inlet duct 34 to supply fresh air to and cool the engine 19. The path of the incoming air is indicated by the inlet arrows 37.

The warm air from the engine 19 passes up through the outlet ducts 35 and out through the outlets 36 at the rear side of the air-cooler 32. The path of the outgoing air is indicated by the outlet arrows 38.

With reference again to FIG. 1, there is shown a front left cornering light 39 which preferably is clear in color, a front left turn signal light 40 which preferably is amber in color, a front left parking light 41 which preferably is yellow in color, a front grille 42, a front right parking light 43, and a front right turn signal light 44. The tractor 1 is also provided with a front right cornering light (not shown) which is similar to the front left cornering light 39.

It should be noted that the front left turn signal light 40 is disposed at and around the front right edge of the tractor body 2 so that the light 40 is visible from the front of and from the left side of the tractor 1. Similarly, the front right turn signal light 44 is disposed at and around a front right edge of the tractor body 2 so that the turn signal light 44 is visible from in front of and from the right side of the tractor 1.

The front grille 42 having a streamlined contour is shown in FIG. 1 in its closed position. The grille 42 is preferably constructed to slide or pivot to an open position to expose various lights (not shown), such as high-beam lights, low-beam lights, fog lights, etc.

One of the salient features of the aerodynamically shaped tractor 1 is a first streamline-contoured wrap-around panoramic window 45. The first panoramic window 45 is disposed above the aforementioned lights and comprises the major portion of the front of the tractor body 2 and extends around the front right and left edges of the tractor body 2 to afford vastly improved visibility to the driver and other occupants of the tractor 1.

A second wrap-around panoramic window 46 which is upwardly slanted and streamline-contoured is disposed between the first panoramic window 45 and an upwardly-slanted roof portion provided with the aerodynamic air-cooler 32. Preferably, the second panoramic window 46 provides visibility and light for the second level which is illustrated in FIG. 3. The second panoramic window 46 extends across the entire width of the tractor body 2 and continues over portions of the right and left sides, respectively, of the tractor body 2.

FIG. 5 shows a partial view of the upper left rear corner of the tractor 1. Beneath aerodynamic air-cooler 32 there is disposed: rear left and right side marker lights, of which only the rear left side marker light 47 is shown; rear left and right turn signal lights, of which only the rear left turn signal light 48 is shown; rear left and right running lights 49 and 58, respectively; rear left and right fog lights 50 and 57, respectively; rear left and right brake lights 51 and 56, respectively; rear left and right back-up lights 52 and 55, respectively; TV camera 53; and license plate 54.

Preferably, the rear side marker lights are yellow in color; the rear turn signal lights are orange in color; the rear running lights are red in color, the rear fog lights are high-intensity dark red lights; the rear brake lights are red in color; and the rear back-up lights are clear.

The images and pictures taken by the TV camera 53 may preferably be displayed on a screen above the middle portion of the instrument panel in the driver control area 3. In this fashion, such TV pictures may be readily observed by the driver from the driver's seat without obstructing the instruments set forth on the instrument panel. Similarly, separate screens and TV cameras may be employed for the right and left sides of the tractor, and for observing the conditions in the machinery portions of the tractor 1.

As shown in FIG. 1, there is also provided a side window 59, and a backside door 60.

There has been disclosed hereinabove a preferred practical embodiment of the present invention. However, it is to be understood that the essential features thereof could readily be incorporated in many other alternative structural forms, and the privilege of resorting to all such legitimate changes in the forms, of construction and arrangement of the several features and parts as may fairly be comprehended within the spirited scope of the appended claims are hereby reserved.

I claim:

1. A vehicle provided with living quarters disposed therein, comprising a vehicle body; a first level including a first plurality of equipment and areas disposed within said vehicle body; a second level including a second plurality of equipment and areas disposed within said vehicle body; said second level being disposed above said first level; said first plurality of equipment and areas including a driver control area; said second plurality of equipment and areas including at least one sleeping compartment; an air-cooler operably and mechanically connected with said engine to convey fresh air to said engine and to convey air away from said engine, said air-cooler having an inlet and an outlet; and an engine disposed at the rear of said vehicle body at said first level, wherein the improvement comprises:

a first panoramic window defining a major portion of the front of said vehicle body and having curved wrap-around side edges extending around the front right and left edges of said vehicle body to define a streamlined contour of said first panoramic window;

said air-cooler being aerodynamically disposed in an upper rear roof portion of said vehicle body, and being streamlined;

a second panoramic window disposed between said first panoramic window and said air-cooler, said second panoramic window providing visibility and light for said second level, and defining a first roof portion of said vehicle body;

said second panoramic window being upwardly slanted from a front edge thereof disposed substantially adjacent the upper edge of said first panoramic window to a rear edge thereof, and having curved wrap-around side edges extending around the upper portions of the right and left sides of said vehicle body, to define a streamlined contour of said second panoramic window;

a second roof portion of said vehicle body extending substantially upwardly and continuously from said rear edge of said second panoramic window to a rear portion thereof having said air-cooler disposed therein; and said first panoramic window, said second panoramic window, and said second roof portion of said vehicle body including said air-cooler disposed therein, together defining an aerodynamically-streamlined upper contour of said vehicle body.

2. A vehicle according to claim 1, wherein:

said inlet of said air-cooler is disposed substantially at the uppermost portion of said second roof portion of said vehicle body and is positioned so that when said vehicle is in motion the on-rushing air will pass over said first panoramic window, over said second panoramic window, and into said inlet of said air-cooler;

there is provided at least one inlet duct which extends substantially the entire vertical rear dimension of said vehicle body for interconnecting said air-cooler inlet with said engine for supplying fresh in-coming air to said engine; and there is provided at least one outlet duct which extends substantially the entire vertical rear dimension of said vehicle body to interconnect said engine with said outlet of said air-cooler for conveying warm air from said engine to the ambient atmosphere.

3. A vehicle according to claim 2, wherein:

there is provided adjacent to and below said outlet of said air-cooler a substantially horizontal arrangement of predetermined lights and equipment;

said predetermined lights and equipment includes a rear light turn signal light which is disposed at and around the upper rear right edge of said vehicle body so that said rear right turn signal light is visible from in back of and from the right side of said vehicle; and said predetermined lights and equipment includes a rear left turn signal light disposed at and around the upper portion of a rear left edge of said vehicle body so that said rear left turn signal light is visible from in back of and from the left side of said vehicle.

4. A vehicle according to claim 3, wherein:

said rear right turn signal light is disposed between a rear right side marker light and a rear right running light;

said rear left turn signal light is disposed between a rear left side marker light and a rear left running light;

said rear right and left side marker lights are disposed on the upper right and left side portions, respectively, of said vehicle body; and each said rear running light is followed in seriatim by a high-intensity dark red fog light, a red brake light, and a clear back-up light.

5. A vehicle according to claim 1, wherein:

immediately below said first panoramic window there is disposed a front grille which is movable to cover or expose high and low beam headlights for said vehicle, said front grille defining a substantially streamline-contoured surface for the lower front portion of said vehicle body.

6. A vehicle according to claim 5, wherein:

said inlet of said air-cooler comprises a series of louvered inlets for facilitating the entrance of fresh on-rushing air into said inlet duct.

7. A vehicle according to claim 1, said vehicle further comprising:

a front right turn signal light disposed at and around a front right edge of said vehicle body so that said front right turn signal light is visible from in front of and from the right side of said vehicle; and a front left turn signal light disposed at and around a front left edge of said vehicle body so that said front left turn signal light is visible from in front of and from the left side of said vehicle.

8. A truck tractor comprising a truck tractor body, a driver control area, an engine, and an air-cooler operably and mechanically connected with said engine to convey fresh air to said engine and to convey air away from said engine, said air-cooler having an inlet and an outlet, wherein the improvement comprises:

a first level including a first plurality of equipment and areas disposed within said truck tractor body, said first plurality of equipment and areas including said driver control area;

a second level including a second plurality of equipment and areas disposed within said truck tractor body, said second level being disposed above said first level, and said second plurality of equipment and areas including at least one sleeping compartment;

said engine being disposed at the rear of said truck tractor body at said first level;

a first panoramic window defining the major portion of the front of said tractor body and having curved wrap-around side edges extending around the front right and left edges of said tractor body to define a streamlined contour of said first panoramic window;

said air-cooler being aerodynamically disposed in an upper rear roof portion of said truck tractor body;

a second panoramic window disposed between said first panoramic window and said air-cooler, said second panoramic window providing visibility and light for said second level and defining a first roof portion of said truck tractor body;

said second panoramic window being upwardly slanted from a front edge thereof disposed substantially adjacent the upper edge of said first panoramic window to a rear edge thereof, and having curved wrap-around side edges extending around the upper portions to the right and left sides of said truck tractor body, to define a streamlined contour of said second panoramic window;

a second roof portion of said truck tractor body extending substantially upwardly and continuously from said rear edge of said second panoramic window to a rear portion thereof having said air-cooler disposed therein; and said first panoramic window, said second panoramic window, and said roof portion of said truck tractor body including said air-cooler disposed therein, together defining an aerodynamically-streamlined upper contour of said vehicle body.

9. A truck tractor according to claim 8, wherein:

said inlet of said air-cooler is disposed substantially at the uppermost portion of said second roof portion of said truck tractor body and is positioned so that when said vehicle is in motion the on-rushing air will pass over said first panoramic window, over said second panoramic window, and into said inlet of said air-cooler;

there is provided at least one inlet duct which extends substantially the entire vertical rear dimension of said truck tractor body for interconnecting said air-cooler inlet with said engine for supplying fresh in-coming air to said engine; and there is provided at least one outlet duct which extends substantially the entire vertical rear dimension of said truck tractor body to interconnect said engine with said outlet of said air-cooler for convenying warm air from said engine to the ambient atmosphere.

10. A truck tractor according to claim 8, wherein:

immediately below said first panoramic window there is disposed a front grille which is movable to cover or expose high and low beam headlights for said truck tractor, said front grille defining a substantially streamline-contoured surface for the lower front portion of said truck tractory body; and said inlet of said air-cooler comprises a series of louvered inlets for facilitating the entrance of fresh on-rushing air into said inlet duct.

* * * * *